(12) United States Patent
Kayama et al.

(10) Patent No.: US 7,118,182 B2
(45) Date of Patent: Oct. 10, 2006

(54) AXLE UNIT FOR DRIVING WHEEL

(75) Inventors: Shigeoki Kayama, Kanagawa (JP); Hideo Ouchi, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/240,857

(22) PCT Filed: Apr. 3, 2001

(86) PCT No.: PCT/JP01/02891

§ 371 (c)(1), (2), (4) Date: Oct. 4, 2002

(87) PCT Pub. No.: WO01/76891

PCT Pub. Date: Oct. 18, 2001

(65) Prior Publication Data

US 2003/0155803 A1    Aug. 21, 2003

(30) Foreign Application Priority Data

Apr. 5, 2000  (JP) .............................. 2000-103790
Nov. 27, 2000 (JP) .............................. 2000-359075

(51) Int. Cl.
*B60B 27/00* (2006.01)
*B60K 17/30* (2006.01)
*F16C 13/00* (2006.01)

(52) U.S. Cl. ................ 301/105.1; 301/124.1; 384/544; 180/252

(58) Field of Classification Search ............ 301/105.1, 301/109–110, 111.01, 111.03; 384/544, 543, 384/537–538; 180/252, 258, 259; 29/894.36, 29/894.361
See application file for complete search history.

(56) References Cited

U.S. PATENT DOCUMENTS

| | | | | |
|---|---|---|---|---|
| 4,150,553 A * | 4/1979 | Aucktor | .................. | 464/178 |
| 4,835,829 A * | 6/1989 | Welschof et al. | ...... | 29/894.361 |
| 4,887,917 A * | 12/1989 | Troster et al. | .............. | 384/543 |
| 5,226,738 A | 7/1993 | Valette et al. | | |
| 5,542,508 A * | 8/1996 | Van Erden et al. | ......... | 188/130 |
| 5,674,011 A | 10/1997 | Hofmann et al. | | |
| 5,725,285 A * | 3/1998 | Niebling et al. | ......... | 301/105.1 |
| 6,022,275 A * | 2/2000 | Bertetti | ...................... | 464/178 |
| 6,135,571 A * | 10/2000 | Mizukoshi et al. | ...... | 301/105.1 |
| 6,286,909 B1 * | 9/2001 | Mizukoshi et al. | ...... | 301/105.1 |
| 6,443,622 B1 * | 9/2002 | Webb et al. | ................ | 384/448 |
| 6,619,852 B1 * | 9/2003 | Toda et al. | ................. | 384/537 |

FOREIGN PATENT DOCUMENTS

| | | |
|---|---|---|
| EP | 0 892 187 A2 | 1/1999 |
| EP | 0 936 086 A2 | 8/1999 |
| EP | 0 992 698 A2 | 9/1999 |
| JP | 63-184501 A | 7/1988 |

(Continued)

*Primary Examiner*—Jason R. Bellinger
(74) *Attorney, Agent, or Firm*—Sughrue Mion, PLLC

(57) ABSTRACT

A drive-wheel axle unit which prevents the mutual contact portion between a caulk portion (29a) of a hub (6a) and an outer-end face (39) of a housing portion (11) of a drive shaft member (31) from being exhausted, thereby preventing the occurrence of shaky motion, strange sounds and vibrations for a long period of time. A flat surface (38) is formed in the end face of the caulk portion (29a), and is contacted over a large area with the outer end face (39), which makes it possible to reduce the contact surface pressure in the mutual contact portion between the flat surface (38) and outer end face (39).

2 Claims, 12 Drawing Sheets

FOREIGN PATENT DOCUMENTS

| | | |
|---|---|---|
| JP | 7-317754 A | 12/1995 |
| JP | 11-5404 A | 1/1999 |
| JP | 11-129703 A | 5/1999 |
| JP | 2000-38005 A | 2/2000 |
| JP | 11-624 | 5/2000 |
| JP | 2000-142009 A | 5/2000 |

* cited by examiner

AXLE UNIT FOR DRIVING WHEEL

TECHNICAL FIELD

An axle unit for a driving wheel according to the present invention is a so called fourth-generation hub unit in which a constant velocity joint and a hub unit are removably connected together as an integral body; and, the axle unit is used not only to support the drive wheels (front wheels of an FF car (a front-engine front-wheel-drive car, the rear wheels of an FR car (a front-engine rear-wheel-drive car) and an RR car (a rear-engine rear-wheel-drive car), and a 4WD car (a four-wheel-drive car)) supported on the independent suspension in such a manner that the drive wheels can be rotated with respect to the suspension, but also to drive or rotate these drive wheels.

BACKGROUND ART

To support the wheels so as to be rotatable with respect to the suspension, there are used various axle units in which outer and inner rings are rotatably combined together through rolling elements. An axle unit for a driving wheel—which is used not only to support the drive wheels on the independent suspension, but also to drive and rotate the drive wheels—in combination with a constant velocity joint, must be able to transmit the rotary motion of the drive wheels smoothly (that is, in such a manner that the constant velocity performance can be secured) regardless of not only the mutual shift between the differential gears and drive wheels but also the steering angles applied to the wheels. As an axle unit for a driving wheel referred to as a so called fourth-generation hub unit, which, in combination with a constant velocity joint, can be structured so as to be relatively compact and light in weight, there is conventionally known an axle unit disclosed in JP-A-7-317754, or an axle unit disclosed in the specification of U.S. Pat. No. 5,674,011.

Now, FIG. 10 shows a first example of the conventional structure disclosed in the above-cited JP-A-7-317754. According to this structure, the axle unit is assembled to a vehicle and is supported on the suspension. In this state, an outer ring 1, which is disposed so as not to rotate, includes in the outer peripheral surface thereof an outwardly-facing flange-shaped mounting portion 2 to be supported on the suspension and, in the inner peripheral surface thereof a double row of outer ring raceways 3, 3. On the inside diameter side of the outer ring 1, there is disposed a hub 6 which is composed of a combination of a first element 4 and a second element 5. Of the two elements, the first element 4 is formed in a cylindrical shape. Specifically, in the cylindrical-shaped first element 4, on the direction of an outer-end (in the present specification, the outer end with respect to the width direction of the axle unit when it is assembled to a vehicle; in FIG. 10, the left end) portion of the outer peripheral surface thereof, there is formed a mounting flange 7 which is used to support the wheel; and, in the direction of an inner-end (in the present specification, the central end with respect to the width direction of the axle unit when it is assembled to a vehicle; in FIG. 10, the right end) portion of the outer peripheral surface thereof, there is formed an inner raceway 8. On the other hand, in the case of the second element 5, one end portion (in FIG. 10, the left end) thereof is formed as a cylindrical portion 9 to which the outer surface of the first element 4 can be fitted and fixed; the other end portion (in FIG. 10, the right end) thereof is formed as a housing portion 11 which defines the outer ring of a constant velocity joint 10 of a Zwepper type or a bar field type; and, in the outer peripheral surface of the middle portion thereof, there is formed an inner raceway 8. A plurality of rolling elements 12, 12 are interposed between the above-mentioned outer raceways 3, 3 and inner raceways 8, 8, whereby the hub 6 is rotatably supported inside the outer ring 1.

Also, in the mutually matched positions of the inner peripheral surface of the first element 4 and the outer peripheral surface of the second element 5, there are formed an outside securing groove 13 and an inside securing groove 14 respectively. A retaining ring 15 is bridgingly interposed between the two securing grooves 13, 14. In this manner, the first element 4 is prevented from slipping out of the second element 5. Further, a weld 17 is produced between the outer peripheral edge portion of the outer end face (in FIG. 10, the left end face) and the inner peripheral edge portion of a stepped portion 16 formed in the inner peripheral surface of the first element 4, thereby connecting and fixing the first and second elements 4, 5 to each other.

Further, between the two end opening portions of the outer ring 1 and the outer peripheral surface of the middle portion of the hub 6, there are interposed not only substantially cylindrical-shaped covers 18, 18 made of metal plates such as stainless steel plates, but also circular-ring-shaped seal rings 19, 19 made of elastic material such as rubber or elastomer. Also, on the inside of the middle portion of the second element 5, there is formed a partition plate portion 20 which is used to close the inside of the second element 5. These covers 18, 18, seal rings 19, 19 and partition plate portion 20 not only shut off the portion where the plurality of rolling elements 12, 12 are disposed or the constant velocity joint 10 portion from the outside to thereby prevent grease from leaking to the outside, but also prevent foreign substances such as rainwater and dust from getting into the inside.

The constant velocity joint 10 is composed of the housing 11, an inner ring 21, a retainer 22, and a plurality of balls 23. Of these parts, the inner ring 21 is fixed to the leading end portion of a drive shaft (not shown) which can be driven or rotated through a transmission by an engine. In the outer peripheral surface of the inner ring 21, there are formed a plurality of inside engaging grooves 24 respectively extending at right angles to the circumferential direction of the inner ring 21. Each of the inside engaging grooves 24 has a section shape which provides an arc shape when it is cut by a virtual plane intersecting at right angles to the center axis of the inner ring 21. The inside engaging grooves 24 are arranged at regular intervals in the circumferential direction of the inner ring 21. Also, in the position of the inner peripheral surface of the housing portion 11 that is opposed to the inside engaging grooves 24, there are formed a plurality of outside engaging grooves 25 each similarly having an arc-shaped section shape in such a manner that they extend at right angles to the circumferential direction of the inner ring 21. And, the retainer 22 has an arc-shaped section and is formed in a circular-ring-like shape as a whole. The retainer 22 is held by and between the outer peripheral surface of the inner ring 21 and the inner peripheral surface of the housing portion 11. In the circumferential-direction, six positions of the retainer 22 are matched to the inside and outside engaging portions 24, 25, and in these positions there are formed six pockets 26 respectively. Inside these six pockets 26, there are held a corresponding number of balls 23, a total of six balls 23. These balls 23, while they are retained in their respective pockets 26, are allowed to roll along the inside and outside engaging portions 24, 25.

When assembling the above-structured drive-wheel axle unit to a vehicle, the outer ring 1 is supported on the suspension through the mounting portion 2, and the drive wheels are fixed to the first element 4 through the mounting flange 7. Also, the leading end portion of the drive shaft—(not shown), which can be driven or rotated by the engine through the transmission and differential gear—is spline engaged with the inside of the inner ring 21 forming the constant velocity joint 10. While the vehicle is running, the rotary motion of the inner ring 21 is transmitted through the plurality of balls 23 to the second element 5 and to the hub 6 to thereby drive or rotate the drive wheels.

Now, FIG. 11 shows a second example of a conventional structure as disclosed in the specification of the above-cited U.S. Pat. No. 5,674,011. In the second conventional example, the inner peripheral surface of an outer ring 1 is fitted with and fixed to the inner surface of a knuckle 27 forming the suspension. The outer ring 1 does not rotate when the present axle unit is in use, and in it there are formed a double row of outer raceways 3, 3. On the direction of an outer-end (in FIG. 11, the direction of left-end) portion of the outer peripheral surface of a hub 6a, there is disposed a mounting flange 7 which is used to support the wheels of a vehicle. In the direction of an inner-end (in FIG. 11, the direction of right-end) portion of the outer peripheral surface of the hub 6a, there are formed a double row of inner raceways 8, 8 through a pair of inner rings 28, 28. These two inner rings 28, 28 are supported on and fixed to the main body portion of the hub 6a by a caulk portion 29 formed by plastically deforming the other end portion of the hub 6a in such a manner that it is bent outwardly in the diameter direction of the hub 6a. Between the outer raceways 3, 3 and inner raceways 8, 8, there are interposed a plurality of rolling elements 12, 12; and, the hub 6a is rotatably supported inside the outer ring 1.

In the central portion of the hub 6a, there is formed a spline hole 30. The thus-structured hub 6a is combined with a drive shaft member 31 to thereby provide an axle unit for a driving wheel. On one end portion of the drive shaft member 31, there is disposed a spline shaft 32 which can be engaged with the spline hole 30. And the other end portion of the drive shaft member 31 is formed as a housing portion 11 which provides an outer ring of a constant velocity joint. The thus-structured drive shaft member 31 and hub 6a are combined together in such a manner that the spline shaft 32 is inserted into the spline hole 30, and a connecting member 33 made of elastic material is unevenly engaged with the two members 31, 6a to thereby prevent the two members 31, 6a from being separated from each other.

Of the respective conventional structures that have been described hereinabove, in the first conventional structure example shown in FIG. 10, the rotary power between the first and second elements 4, 5 forming the hub 6 must be transmitted through the weld 17 portion. That is, between the first element 4 supporting the wheels and the second element 5 connected to the drive shaft, it is necessary to transmit large torque for driving. But because the first and second elements 4, 5 are fitted with each other through respective cylindrical surfaces, large torque cannot be transmitted through the fitting surfaces thereof. Therefore, the large torque must be transmitted through the weld 17 portion. In order to increase the strength of the weld 17 portion to a sufficient level, the entire periphery of the weld 17 must be welded in a cladding manner. However, where the entire periphery of the weld 17 is claddingly welded, heat at the welding time can distort the shape of the inner raceway 8 portions formed in the outer peripheral surface of the first element 4, or can lower the hardness of the inner raceway 8 portions, which makes it impossible to secure sufficient durability of a rolling bearing unit including the inner raceways 8.

Also, in the second conventional structure example shown in FIG. 11, since prevention of the mutual separation between the hub 6a and drive shaft member 31 is attained by the connecting member 33 made of elastic material, the function of the separation prevention thereof seems unreliable. That is, when a vehicle turns suddenly, due to a large thrust load and a moment load applied to the hub 6a from the wheels, there is applied a large force in a direction to pull out the hub 6a from the drive shaft member 31. With such a large pull-out force, it is difficult to positively prevent the mutual separation between the hub 6a and drive shaft member 31. Therefore, this structure is believed not to be able to secure sufficient reliability.

DESCRIPTION OF THE RELATED INVENTION

As a structure which can eliminate the above-mentioned drawbacks, in Japanese Patent Application 11-624, there is disclosed an axle unit for a driving wheel having such a structure as shown in FIG. 12. In the axle unit for a driving wheel according to the prior invention, over the entire periphery of the outer peripheral surface of the outer-end portion of a spline shaft 32, there is formed an inside securing groove 14 which may also be called an inside engaging portion. Further, in such position of the inner peripheral surface of the middle portion of a spline hole 30 that is matched to the inside securing groove 14, there is formed a securing stepped portion 48 which may also be called an outside engaging portion. The securing stepped portion 48 extends over the entire periphery of the inside securing groove 14. Between the inside securing groove 14 and securing stepped portion 48, there is bridgingly interposed a retaining ring 35 which can be produced in such a manner that a line member made of elastic metal such as spring steel, or stainless spring steel, is formed into a substantially C-shaped, incompletely-circular, ring.

Also, the end face of a caulk portion 29, which is used to fix a pair of inner rings 28, 28 to the hub 6a, is contacted with or put near to the outer end face of a housing portion 11 forming the drive shaft member 31. An O ring is held in a hold groove 36 formed in the outer end face of the housing portion 11, and is elastically contacted with the end face of the caulk portion 29. The O ring forms a seal between the end face of the caulk portion 29 and outer end face of the housing portion 11, thereby preventing foreign substances such as rainwater and dust from getting into the spline engaged portion between the spline hole 30 and spline shaft 32, or preventing lubricant such as grease charged into the spline engaged portion from leaking to the outside.

In the case of the above-structured drive-wheel axle unit according to the prior invention, the end face of the caulk portion 29 is disposed opposite the outer end face of the housing portion 11, and is curved when the present caulk portion 29 is formed. If it is left curved as it is, it provides a convex surface having an arc-shaped section. This results in a reduced contact area between the end face of the caulk portion 29 and the outer end face of the housing portion 11 or O ring 37, which raises the following problems.

Firstly, when the end face of the caulk portion 29 and the outer end face of the housing portion 11 are contacted directly with each other, the surface pressure of the contact portion increases. Accordingly, one or both of the end face of the caulk portion 29 and the outer end face of the housing portion 11 is or are exhausted (that is, plastically deformed and thereby dented). This increases a clearance between the end face of the caulk portion 29 and the outer end face of the housing portion 11. Then, as the vehicle runs, the hub 6a is shifted (shaken) in the axial direction with respect to the drive shaft member 31, which gives rise to generation of uncomfortable noises and vibrations.

Also, when the end face of the caulk portion 29 is contacted with the O ring 37, the width (in the diameter direction) of the circular-ring-shaped contact portion is narrow, which makes it difficult to secure the sealing performance between them.

Further, when the calk portion 29 is disposed opposite a seal member, and the portion of the seal member opposed to the caulk portion 29 is flat, surface pressure acting on the seal member easily becomes excessive and uneven. Also, the above-structured drive-wheel axle unit has the caulk portion 29 structured with consideration only to fixation of the inner rings 28, 28 to the hub 6a, without giving consideration to the regulation of the axial-direction dimension of the seal member for the proper interference of the seal member. This makes it difficult to secure not only the durability of the seal member, but also the sealing performance by the seal member.

A drive-wheel axle unit according to the invention is developed in view of the above-mentioned circumstances of the conventional drive-wheel axle units.

DESCRIPTION OF THE INVENTION

In attaining the above object, according to the invention, there is provided an axle unit for driving wheel which, similarly to the above-mentioned conventional axle unit for driving wheel, comprises: an outer ring including an outer raceway in the inner peripheral surface thereof and unrotatable even when the axle unit is in use; a hub, including a mounting flange formed in the outer-end portion of the outer peripheral surface thereof for supporting the wheel, a first inner raceway formed directly—or through an inner ring—in the middle portion thereof, a second inner raceway formed in the inner-end portion thereof, and a spline hole formed in the central portion thereof; a drive shaft member, including a spline shaft disposed on the outer-end portion thereof to be engageable with the spline hole and having an inner-end portion formed as a housing portion serving as the outer ring of a constant velocity joint; and a plurality of rolling elements rollably interposed between the outer raceway and inner raceway.

Further, the drive-wheel axle unit of the invention includes an inside engaging portion, an outside engaging portion, and a retaining ring. The inside engaging portion is formed so as to extend over the entire periphery of the outer peripheral surface of the spline shaft. The outside engaging portion is formed in such a position of the hub as corresponds to the inside engaging portion, and so as to extend over the entire periphery of the inner periphery of the hub. The retaining ring is made of elastic material, and is bridgingly interposed between the inside and outside engaging portions to thereby prevent the spline shaft from slipping out of the spline hole. Also, an inner ring—with the second inner raceway formed in the outer peripheral surface thereof—is fixed to the hub in such a manner that the inner end face of the inner ring is held by a caulk portion. The caulk portion is formed by caulking and spreading such portion of the inner end portion of the hub, as projects beyond the inner end face of the inner ring, outwardly in the diameter direction of the hub. Further, in a portion of the caulk portion which is opposite the outer end face of the housing portion, there is formed a flat surface extending in parallel to the present outer end face. The flat surface and outer-end face are butted against each other directly or through a seal member.

OPERATION

According to the above-structured drive-wheel axle unit of the invention, the mutual contact area between the end face of the caulk portion and the outer-end face of the housing portion (or seal member) can be increased. This can prevent the hub from shifting greatly in the axial direction thereof with respect to the drive shaft member as a vehicle runs which, in turn, can prevent occurrence of jarring noises and vibrations. On the other hand, the mutual contact area between the caulk portion and seal member can be secured to thereby secure the sealing performance by the seal member and the durability of the seal member. Further, in the process for forming the flat surface in a portion of the caulk portion, the regulation of the axial-direction dimension of the hub for the appropriate interference of the seal member can be carried out.

Figure 1:
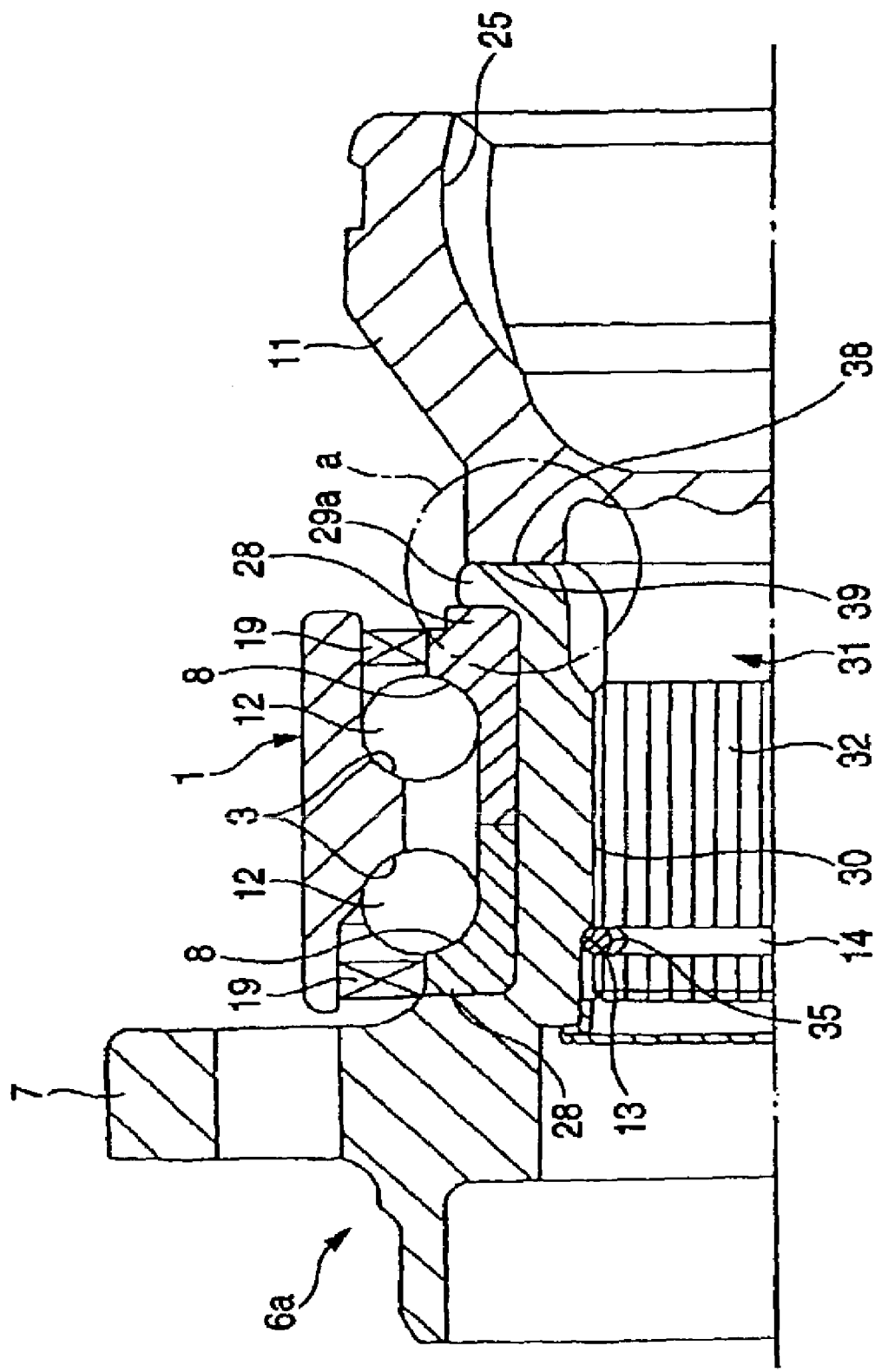
FIG. 1 is a section view of a half section of a first embodiment of a drive-wheel axle unit according to the invention.

Referring to the reference characters used in the drawings, 1 designates an outer ring, 2 a mounting portion, 3 an outer raceway, 4 a first element, 5 a second element, 6, 6a, 6b a hub, 7 a mounting flange, 8 an inner raceway, 9 a cylindrical portion, 10 a constant velocity joint, 11 a housing portion, 12 a rolling element, 13 an outside securing groove, 14 an inside securing groove, 15 a retaining ring, 16 a stepped portion, 17 a weld, 18 a cover, 19 a seal ring, 20 a partition plate portion, 21 an inner ring, 22 a retainer, 23 a ball, 24 an inside engaging groove, 25 an outside engaging groove, 26 a pocket, 27 a knuckle, 28 an inner ring, 29, 29a a caulk portion, 30 a spline hole, 31 a drive shaft member, 32 a spline shaft, 33 a connecting member, 35, 35a a retaining ring, 36 a hold groove, 37 an O ring, 38 a flat surface, 39 an outer end face, 40 an encoder portion, 41 a core metal, 42 a cylindrical portion, 43 a penetration hole, 44 a sensor, 45 a circular ring portion, 46, 46a an elastic plate, 47 a seal lip, 48 a securing stepped portion, 49 a stepped surface, 50 an inclined surface, 51 a shoulder portion, 52 a seal ring, and 53 a seal lip, respectively.

BEST MODE FOR CARRYING OUT THE INVENTION

Figure 2:
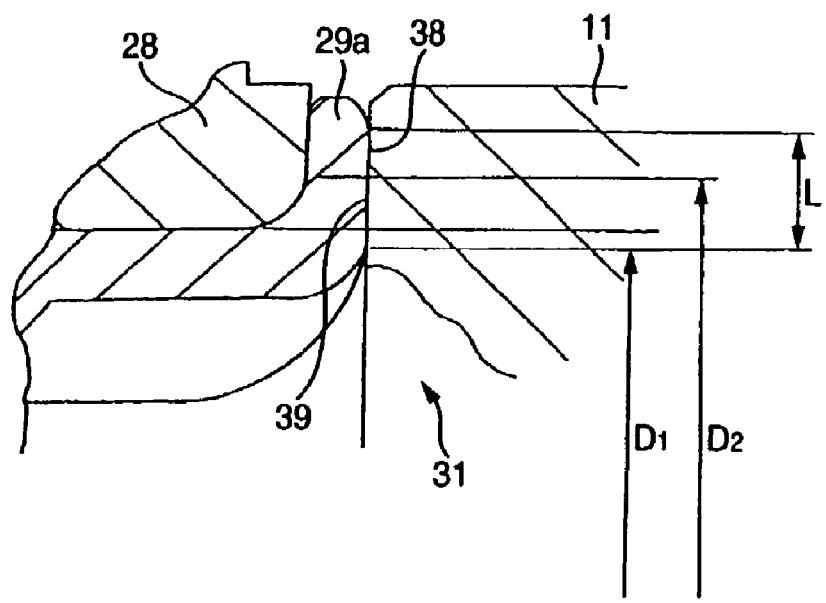
FIG. 2 (A) is an enlarged view of the a portion shown in FIG. 1, while FIG. 2 (B) shows a structure different from the invention for comparison, and is an enlarged view of a portion thereof corresponding to FIG. 2 (A)
Figure 2:
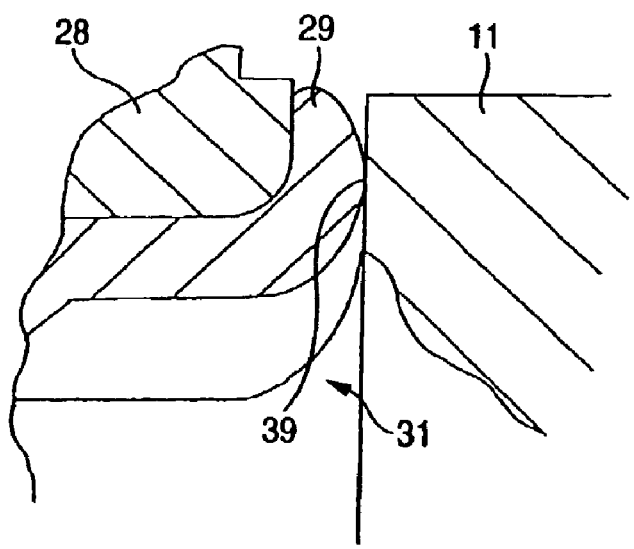
Figure 11:
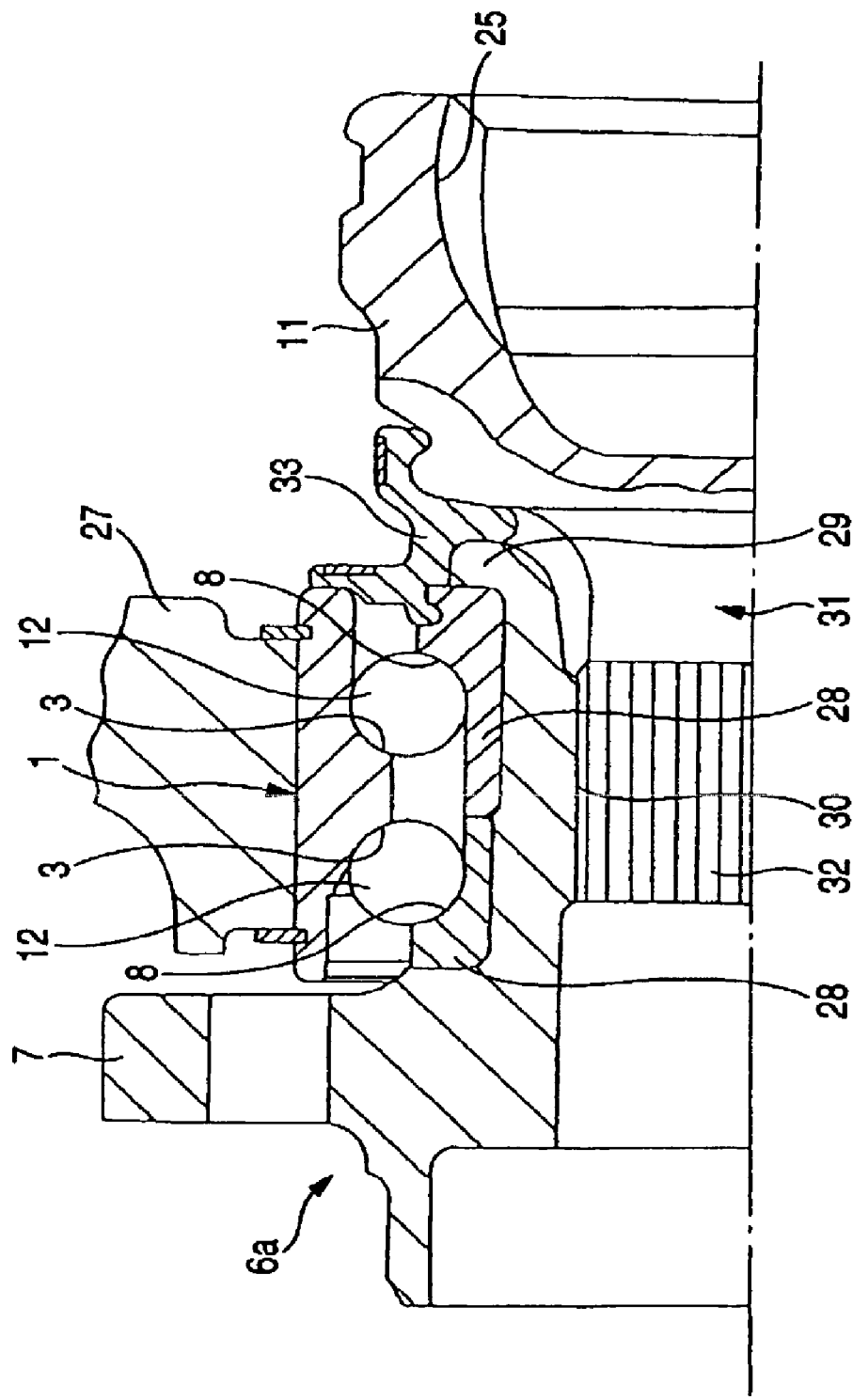
FIG. 11 is a section view of a half section of a second example of the conventional structure; and, FIG. 12 is a section view of a half section of an example of a structure according to a prior invention.
Figure 12:
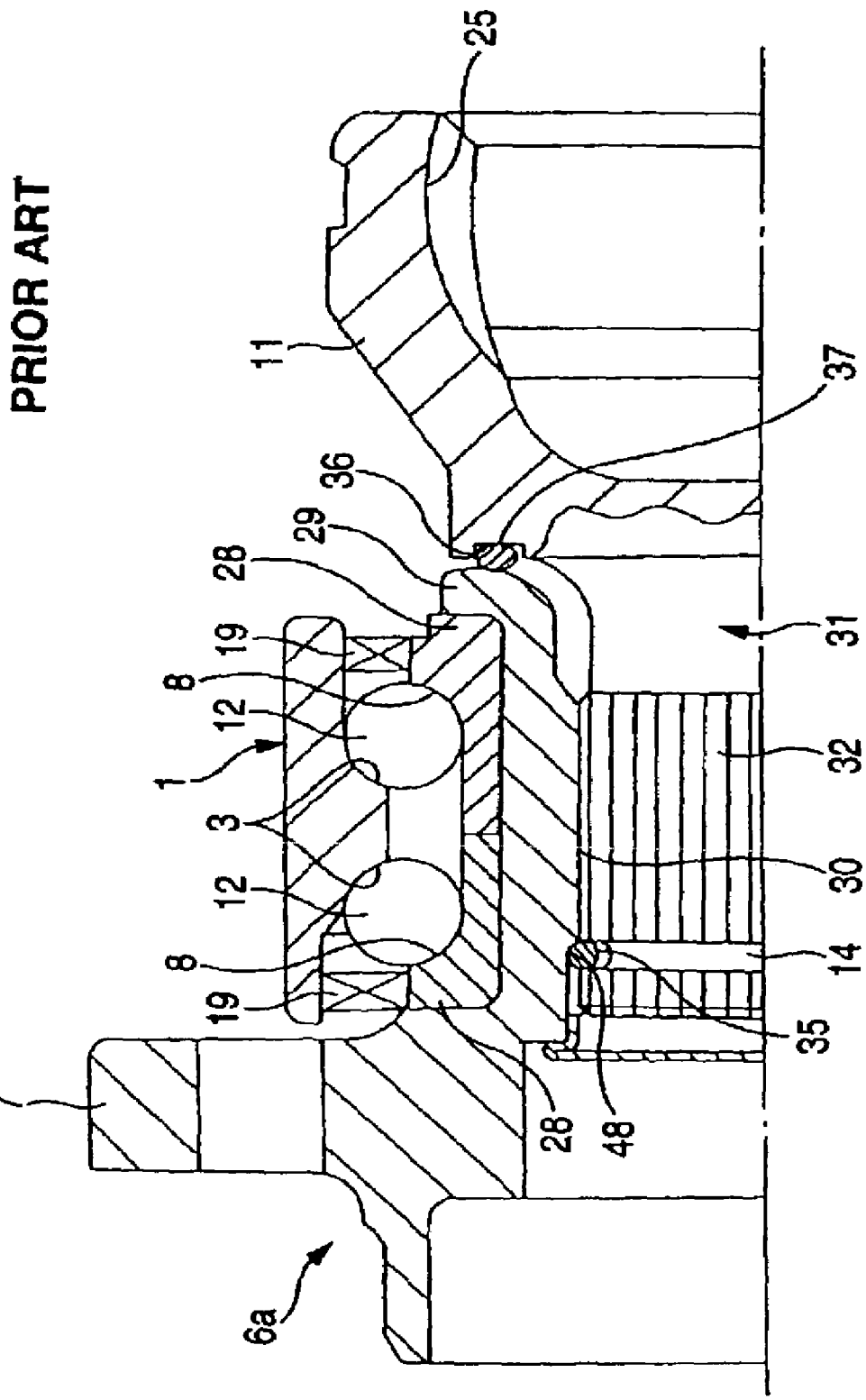

Now, FIGS. 1 and 2 shows a first embodiment of a drive-wheel axle unit according to the invention. By the way, the present embodiment is characterized in that there can be secured the mutual contact area between a caulk portion 29a—formed in the inner-end portion of a hub 6a—and the outer-end face (in FIGS. 1 and 2, the left end face) of a housing portion 11 forming a drive shaft member 31. Thus, the present contact portion is prevented from shaky motion. The basic structure of the present drive-wheel axle unit is similar to the second example of the conventional structure shown in the above-discussed FIG. 11, and the separation-preventive structure between the hub 6a and drive shaft member 31 is similar to the structure according to the prior invention as shown in the above-discussed FIG. 12. Therefore, the portions of the present embodiment similar to the conventional structure and the structure according to the prior invention, which have been mentioned above, are given the same reference numerals and, thus, duplicate description thereof is omitted here. Accordingly, description will be given below mainly of the characteristic portions of the invention.

In the end face of the caulk portion 29a, there is formed a flat surface 38 which exists in a direction to intersect at right angles to the center axis of the hub 6a. This flat surface 38 can be formed in the following manner: that is, as shown in the above-mentioned FIG. 12 or in FIG. 2 (B), a caulk portion 29, the end face of which is convexly curved, is firstly formed; then, the curved end face of the caulk portion 29 is pressurized or cut into a flat surface. When the present drive-wheel axle unit is assembled, the flat surface 38 is butted directly against the outer-end face 39 of the housing 11.

According to the above-structured drive-wheel axle unit of the present embodiment, the mutual contact area between the flat surface 38 (formed in the caulk portion 29a) and the outer end face 39 (of the housing portion 11) can be set large, thereby reducing the surface pressure of the mutual contact portion between these two surfaces 38, 39. Thanks to this, even when a thrust load is applied between the hub 6a and drive shaft member 31 as a vehicle runs, the respective surfaces 38, 39 can be prevented from being exhausted (that is, they can be prevented from being deformed plastically and thus dented). In other words, in the structure according to the prior invention as shown in the above-mentioned FIG. 12, and as shown in FIG. 2 (B), since the end face of the caulk portion 29 is convexly curved, the mutual contact area between the end face of the caulk portion 29 and the outer end face 39 of the housing 11 is small. Thus these two faces are easily exhausted. On the other hand, according to the structure of the present embodiment, because the two surfaces 38, 39 are contacted with each other in such a large area as shown in FIG. 2 (A), these two surfaces 38, 39 can be prevented from being exhausted. This prevents the hub 6a from being shifted in the axial direction with respect to the drive shaft member 31, thereby preventing generation of jarring noises and vibrations.

The radial-direction length L of the flat surface 38 shown in FIG. 2 (A) may be 1–4 mm and, preferably, may be set approximately in the range of 2.5–3.5 mm. Also, in order to prevent bending stress from acting on the caulk portion 29a, the flat surface 38 may be disposed in such a manner that at least the outside-diameter portion thereof is present at least in the portion of an inner ring 28 which is situated outwardly in the diameter direction of the diameter D1 of the fitting portion of the inner ring 28, preferably, in the portion of the inner ring 28 which is situated outwardly in the diameter direction of the diameter D2 of the outside-diameter-side end edge of the corner R portion of the inner ring 28. In case where such dimensional relationship is established between the inner ring 28 and the flat surface 38 of the caulk portion 29a, there can be obtained such a structure wherein only compressive stress is applied to the caulk portion 29a. Thanks to such structure, it is possible to prevent occurrence of the following phenomenon: that is, while the vehicle is running, the caulk portion 29a can be shifted and thus the inner ring 28 fitted with the outer surface of the hub 6a can be moved in the axial direction to thereby reduce the pre-load of the axle unit.

Figure 3:
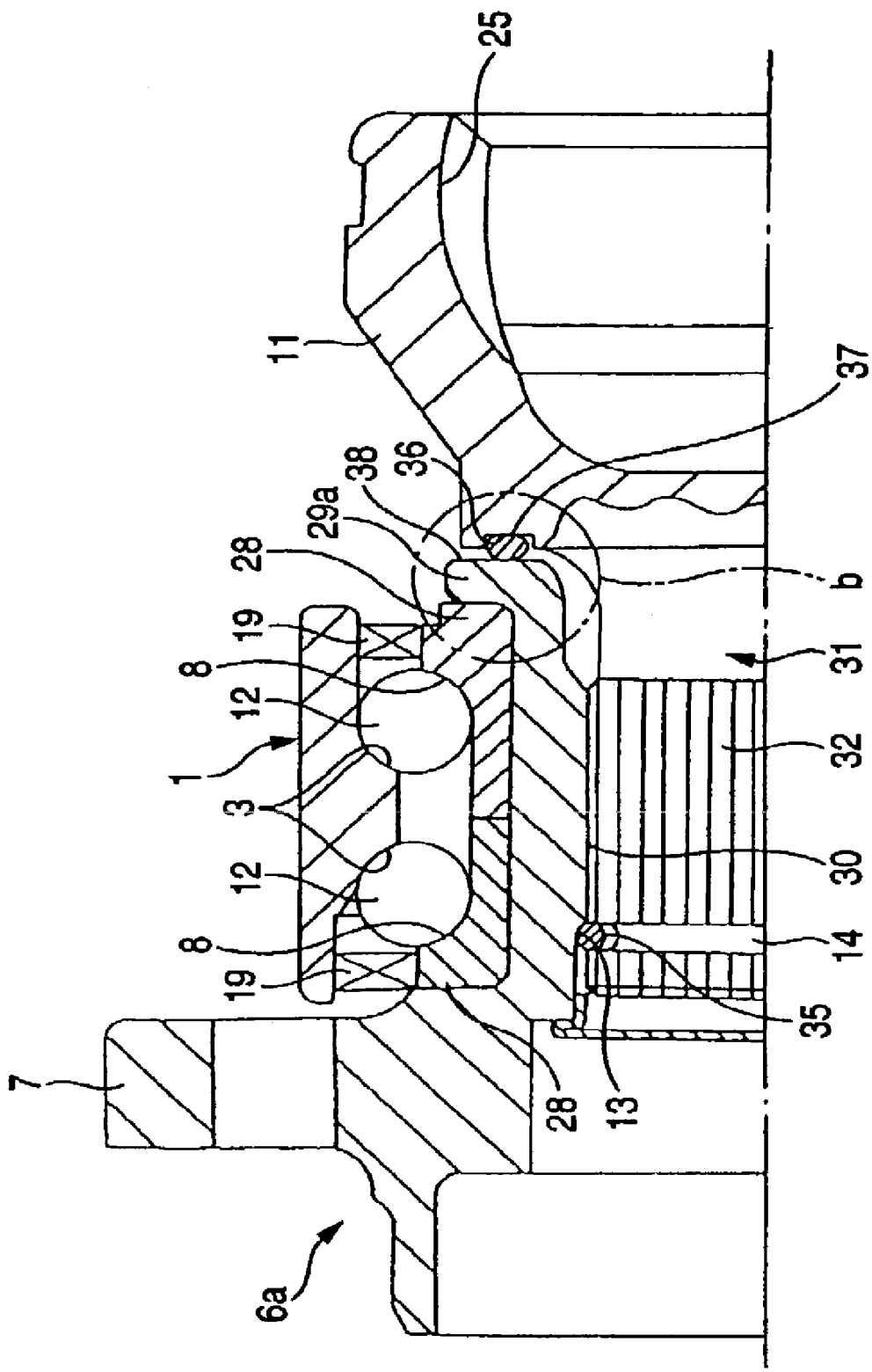
FIG. 3 is a section view of a half section of a second embodiment of a drive-wheel axle unit according to the invention.
Figure 4:
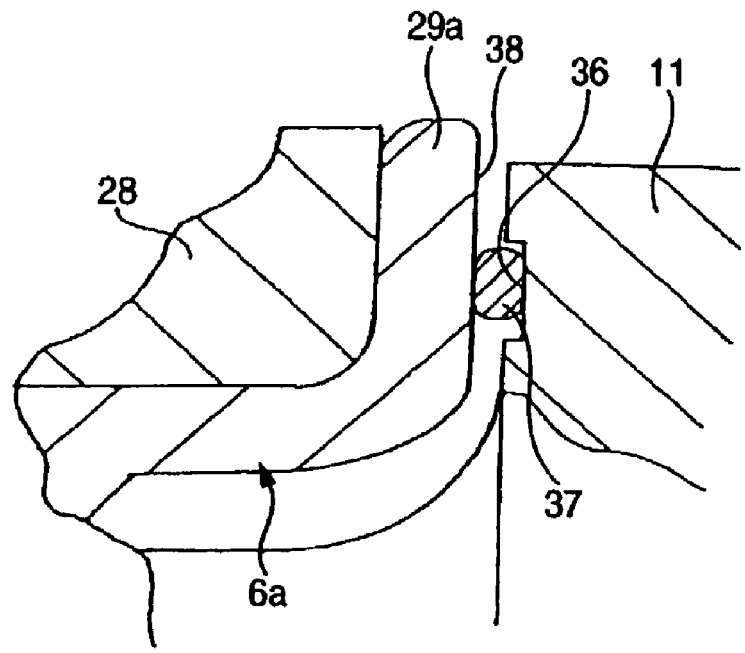
FIG. 4 (A) is an enlarged view of the b portion shown in FIG. 3, while FIG. 4 (B) shows a structure different from the invention for comparison and is an enlarged view of a portion thereof corresponding to FIG. 4 (A)
Figure 4:
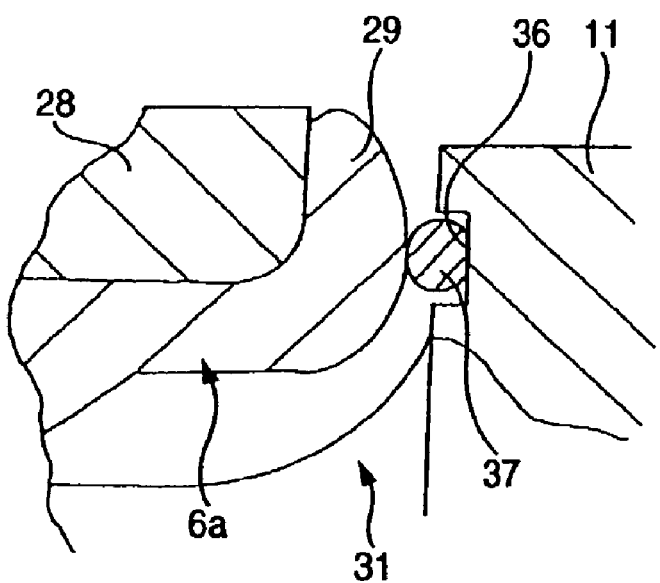

Next, FIGS. 3 and 4 show a second embodiment of a drive-wheel axle unit according to the invention. In the present embodiment, in the end-face of the caulk portion 29a formed in the inner-end portion of the hub 6a, there is formed a flat surface 38 which is disposed in a direction that intersects at right angles to the center axis of the hub 6a. The flat surface 38 is elastically contacted by an O ring 37 which is held in a hold groove 36 formed in the outer end face of the housing portion 11. In this state, the O ring 37 is elastically compressed and, as shown in FIG. 4 (A), is contacted with a large area of the flat surface 38. Therefore, the seal width provided by the O ring 37 (the diameter-direction dimension of the contact portion) is large, which makes it possible to secure sufficient sealing performance. In the structure according to the prior invention shown in FIG. 12 and FIG. 4 (B), because the end face of the caulk portion 29 is convexly curved, the diameter-direction dimension of the contact portion between the end face of the calk portion 29 and the O ring 37, that is, the seal width, is small. Therefore, it is difficult for the O ring 37 to secure sufficient sealing performance. On the other hand, in the second embodiment of the invention, since the seal width is large, the sealing performance by the O ring 37 is enhanced. The enhanced sealing performance effectively keeps foreign substances such as dust from getting into the spline engaged portion between the spline hole 30 and spline shaft 32 for a long period of time which, in turn, can prevent wear of the spline engaged portion, thereby enhancing the durability of the drive-wheel axle unit.

Figure 5:
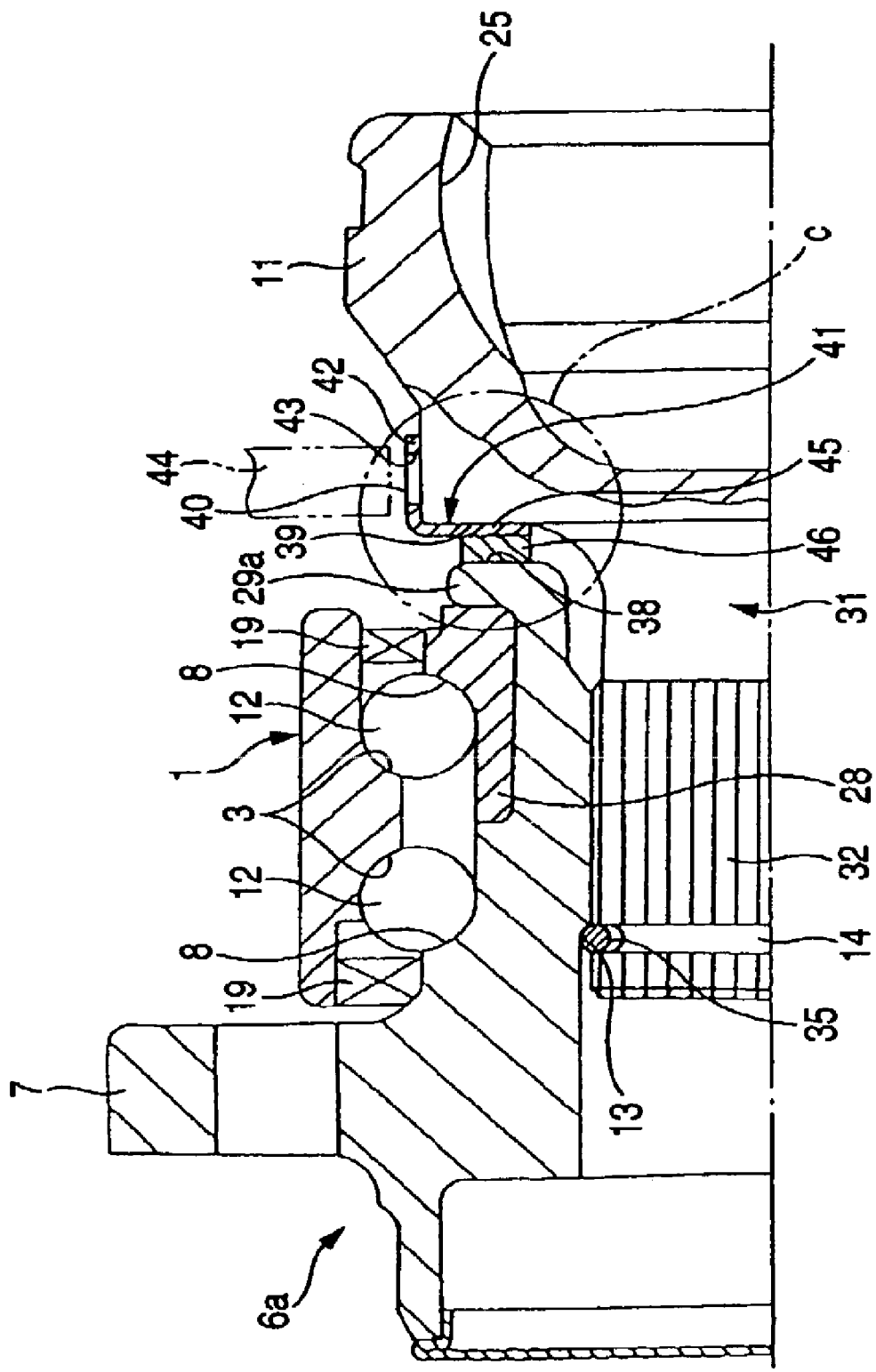
FIG. 5 is a section view of a half section of a third embodiment of a drive-wheel axle unit according to the invention.
Figure 6:
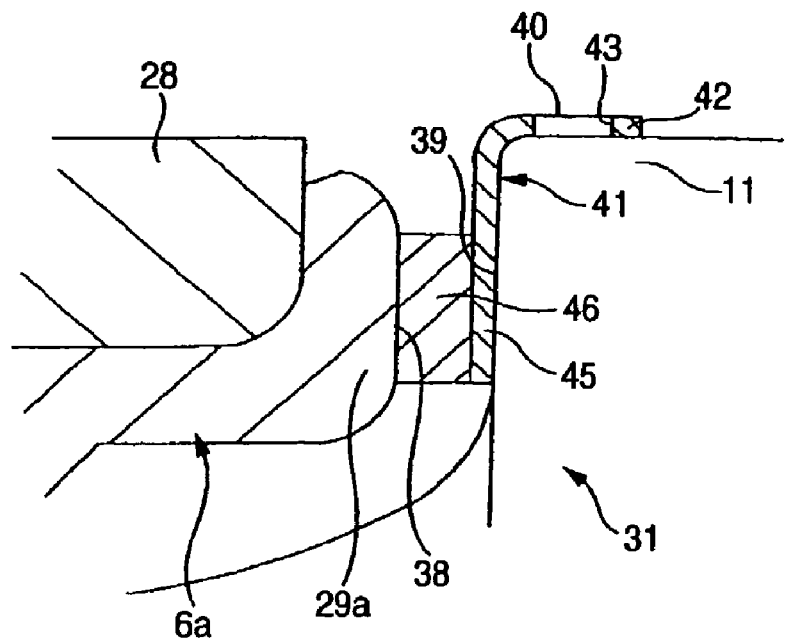
FIG. 6 (A) is an enlarged view of the c portion shown in FIG. 5, while FIG. 6 (B) shows a structure different from the invention for comparison and is an enlarged view of a portion thereof corresponding to FIG. 6 (A)
Figure 6:
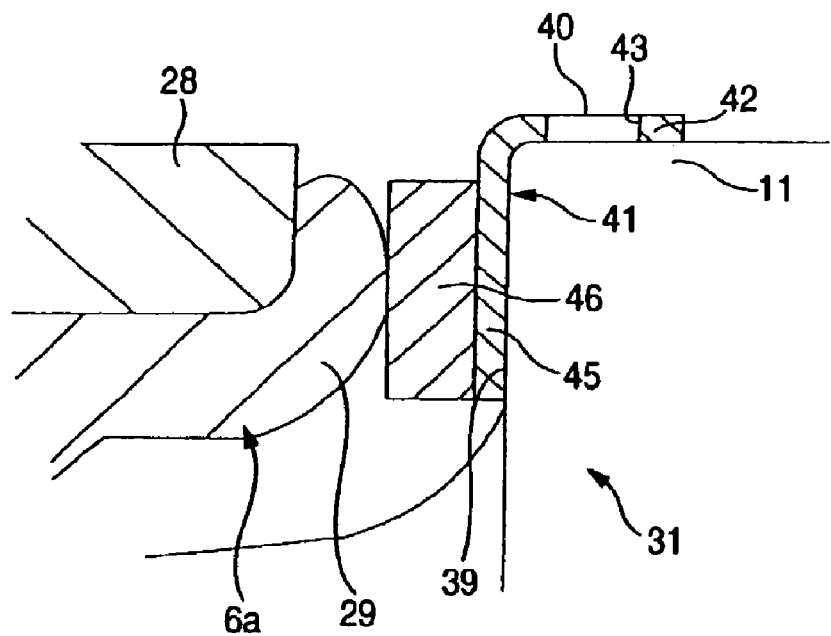

Next, FIGS. 5 and 6 show a third embodiment of a drive-wheel axle unit according to the invention. In the present embodiment, a core metal 41 (including an encoder portion 40) is fitted with and fixed to the outer surface of the outer-end portion of the housing portion 11, thereby allowing detection of the rotation speed of the drive shaft member 31. This core metal 41 can be formed in the following manner: an anticorrosive magnetic metal plate (such as a stainless steel plate made of SUS430) is formed, by bending, into a circular ring with an L-shaped section as a whole. The core metal 41 is fixed to the drive shaft member 31 in such a manner that a cylindrical portion 42, formed in the outer-peripheral-edge portion thereof, is closely fitted with the outer surface of the outer end portion of the housing portion 11. Also, in the cylindrical portion 42, there are formed a large number of slit-shaped penetration holes 43 at regular intervals in the circumferential direction thereof. The penetration holes 43 are respectively long in the axial direction of the cylindrical portion 42 (in FIGS. 5 and 6, in the right and left direction). For this reason, the magnetic characteristics of the outer peripheral surface of the cylindrical portion 42 vary alternately and at regular intervals with respect to the circumferential direction. When the present drive-wheel axle unit is assembled to a vehicle, a detect portion of a sensor 44 is supported on the fixed portion of the vehicle (such as the suspension), and is disposed close to and opposed to the encoder portion 40 which is the outer peripheral surface of the cylindrical portion 42, thereby allowing detection of the rotation speed of the drive shaft member 31 which rotates synchronously with the wheels of the vehicle.

The circular ring portion 45 of the core metal 41 is contacted with the outer end face 39 of the housing portion 11. A circular-ring-shaped elastic plate 46 serves as a seal member, and is attached by adhesion or by plating to the outer surface of the circular ring portion 45. Further, the elastic plate 46 is compressed together with the circular ring portion 45 between the outer end face 39 of the housing portion 11 and a flat surface 38 formed in the end face of a caulk portion 29a disposed in the inner end portion of a hub 6a. In the thus compressed state, the elastic plate 46 is held together with the circular ring portion 45 in such a manner as shown in FIG. 6 (A). In the present embodiment, since the flat surface 39 is contacted with the elastic plate 46 in a large area, the surface pressure to be applied to the elastic plate 46 can be limited to a proper range and also can be made almost uniform. It is thus easy to secure not only the durability of the elastic plate 46 but also the sealing performance that can be provided by the elastic plate 46. On the other hand, as shown in FIG. 6 (B), when the end face of the caulk portion 29 is convexly curved, the diameter-direction dimension of the contact portion between the end face of the caulk portion 29 and elastic plate 46, that is, the seal width, is small, which makes it difficult to secure the durability of the elastic plate 46 and the sealing performance by the elastic plate 46. According to the present embodiment, however, since the seal width can be set large, it is possible to secure the durability of the elastic plate 46 and the sealing performance by the elastic plate 46.

Figure 7:
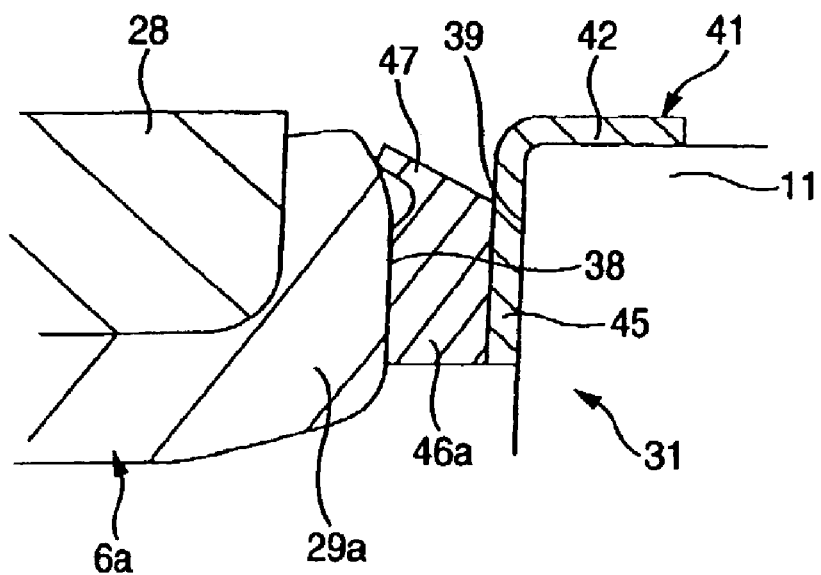
FIGS. 7 (A) and (B) are similar to FIGS. 6 (A) and (B), but show a fourth embodiment of a drive-wheel axle unit according to the invention.
Figure 7:
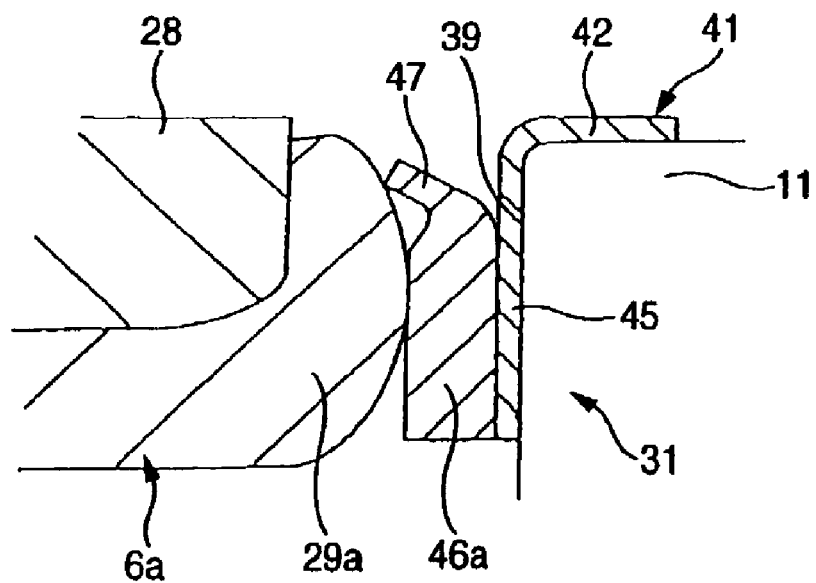

Next, FIG. 7 (A) shows a fourth embodiment of a drive-wheel axle unit according to the invention. In the present embodiment, on the outer peripheral edge portion of an elastic plate 46a, there is disposed a seal lip 47 which is relatively small in thickness, low in rigidity and easy to flex. The leading-end edge of the seal lip 47 is contacted with the entire periphery of the near-to-outer-periphery portion of the end face of a caulk portion 29a to thereby provide a seal between the circular ring portion 45 of a core metal 41 and the caulk portion 29a. In the present embodiment since a flat surface 38 is formed in the end face of the caulk portion 29a (as compared with the structure shown in FIG. 7 (B) which includes a caulk portion 29 having no flat surface), the durability of the elastic plate 46a and the sealing performance by the elastic plate 46a can be secured.

Figure 8:
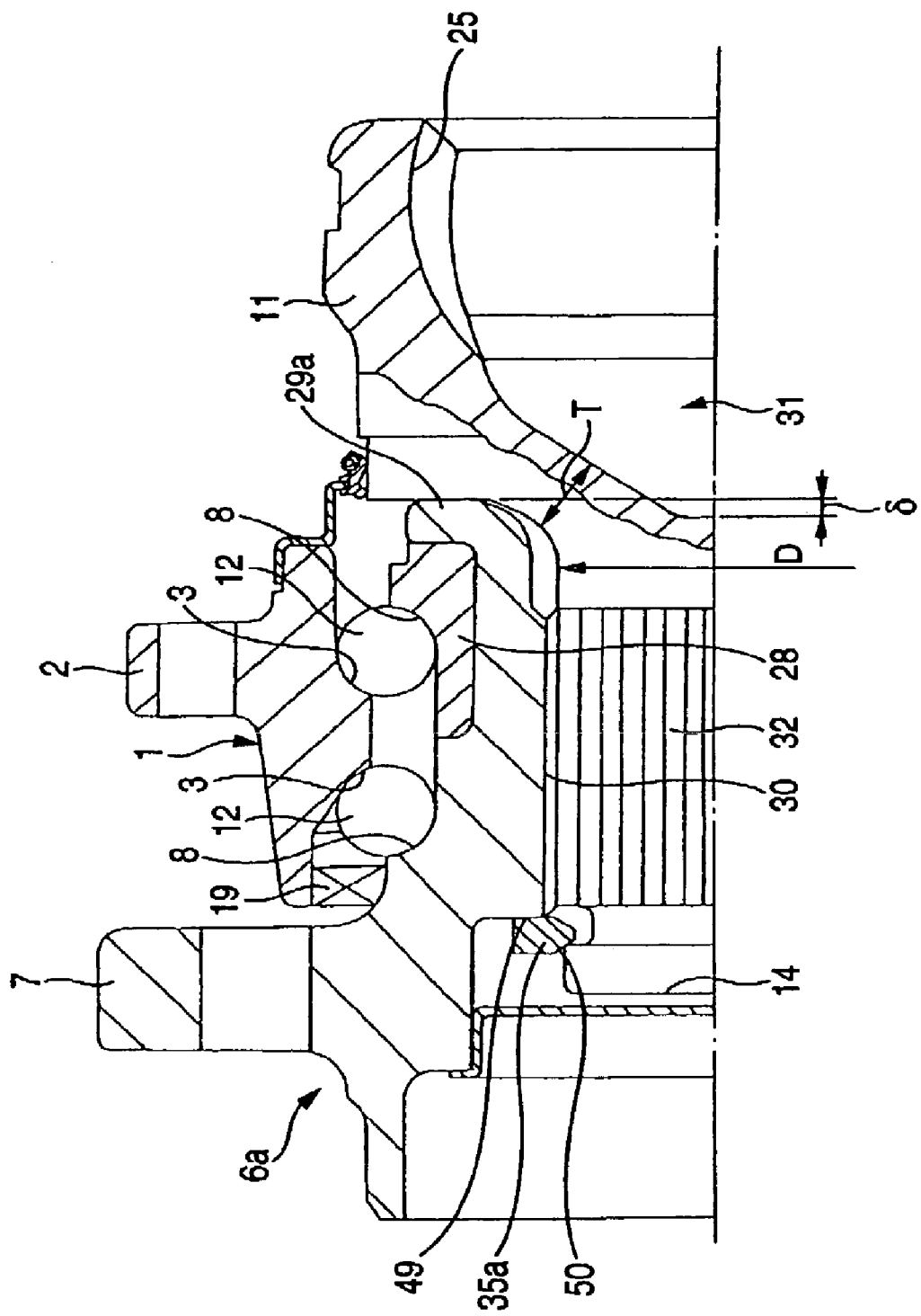
FIG. 8 is a section view of a half section of a fifth embodiment of a drive-wheel axle unit according to the invention.

Next, FIG. 8 shows a fifth embodiment of a drive-wheel axle unit according to the invention. In the present embodiment, between an inside securing groove 14 serving as an inside engaging portion, and a stepped surface 49 serving as an outside engaging portion, there is bridgingly interposed a retaining ring 35a. The retaining ring 35a is formed in an incomplete circular ring shape, and has elasticity in a direction to reduce the diameter dimension thereof. Further the section shape of an inside-diameter-side half section of the retaining ring 35a is a wedge shape (a triangular shape) inclined in a direction where the thickness thereof decreases as it extends toward the inner peripheral edge thereof. Therefore, to the mutual contact portion between an inclined surface 50 (formed in the outer surface of the retaining ring 35a) and the axial-direction outer-end edge of the inside securing groove 14, there is applied, due to the elasticity of the retaining ring 35a, a force which goes in a direction perpendicular to the inclined surface 50. Therefore, to a hub 6a, there is applied a force component which acts inwardly in the axial direction thereof. As a result of this, the inner end face of a caulk portion 29a is pressed against the outer end face of a housing portion 11 forming a drive shaft member 31. In other words, the retaining ring 35a, due to its own elasticity, while enlarging a clearance between the axial-direction outer-end edge of the inside securing groove 14 and the stepped surface 49, reduces its diameter to thereby press the inner end face of the caulk portion 29a against the outer end face of the housing portion 11. As a result, regardless of thrust loads applied repeatedly in different directions during the running operation of the vehicle, the spline engaged portion between a spline hole 30 and a spline shaft 32 can be kept from shifting in the axial direction, which makes it possible to prevent wear in the present spline engaged portion.

Further, in the present embodiment, in order to shorten as much as possible the axial-direction distance from the center of a constant velocity joint to the center of a tire to thereby reduce the steering moment, an outside securing groove 25 formed in the inner peripheral surface of the housing portion 11 of the constant velocity joint is disposed as close as possible to the outer end side to thereby set the section thickness T (shown in FIG. 8) of the root portion of the spline shaft 32 for the bare minimum dimension. When the structure in which the constant velocity joint is fixed to the hub 6a using the retaining ring 35, as opposed to a structure in which a nut is fastened and fixed, since there is not generated large shearing stress in the root portion of the spline shaft 32, the above-mentioned section thickness dimension can be reduced over the structure of a nut fastening type. In the present embodiment, the value of the section thickness T is set in the range of 2–7 mm, thereby allowing reduction not only of the steering moment, but also of the weight of the axle unit. When the ratio of the value of T to the outside diameter D of the root portion of the spline shaft 32 (T/D) is set in the range of 0.09–0.3, the strength of the housing portion 11 with respect to the root portion of the spline shaft 32 can be balanced well and, thus, there can be obtained the optimum design excluding wasteful thickness. The bottom of the hole of the housing portion 11 is projected nearer to the outer end thereof, in the axial direction by an amount of 6, than the outer-end face of the housing 11, which realizes a reduction in the weight of the axle unit.

Figure 9:
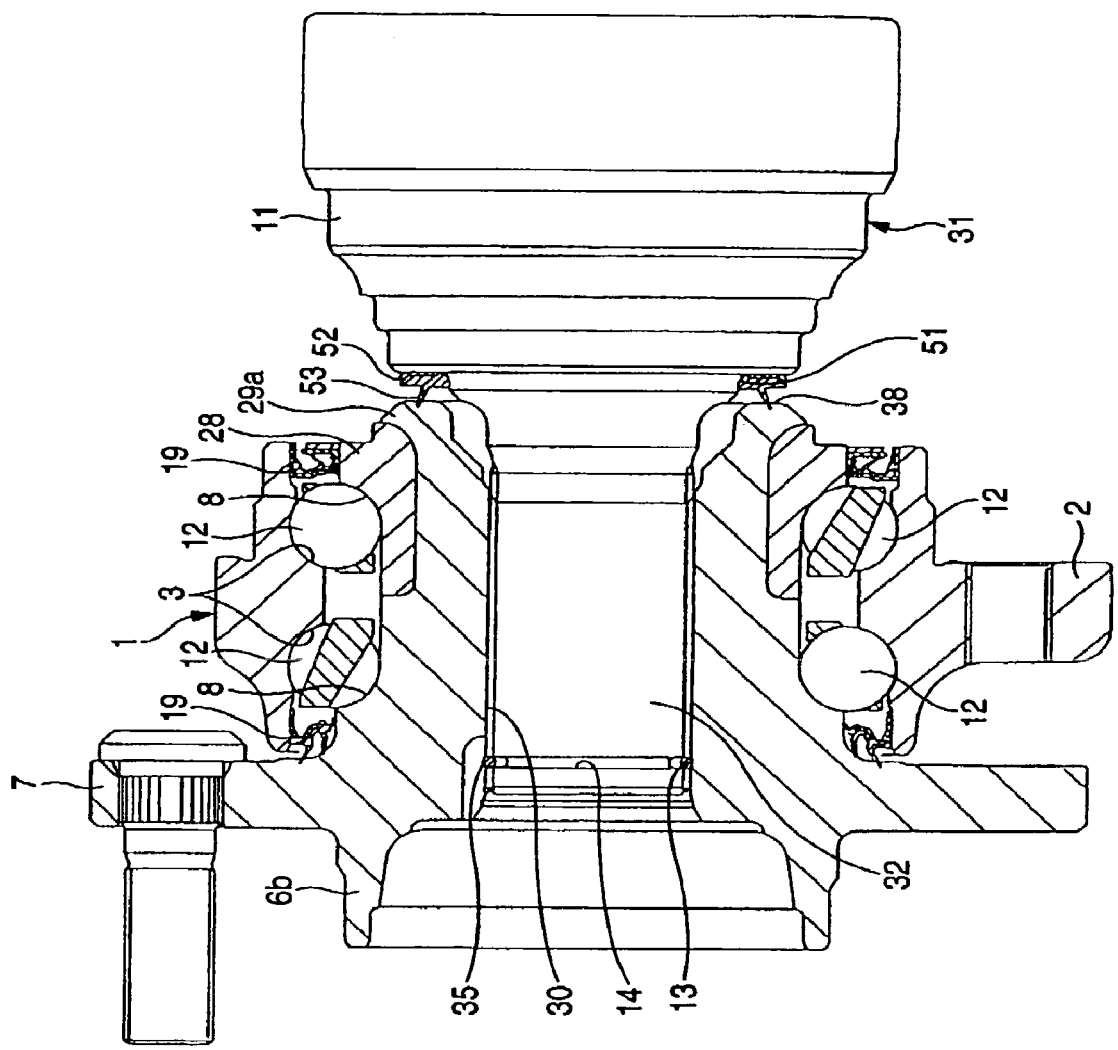
FIG. 9 is a section view of a sixth embodiment of a drive-wheel axle unit according to the invention.
Figure 10:
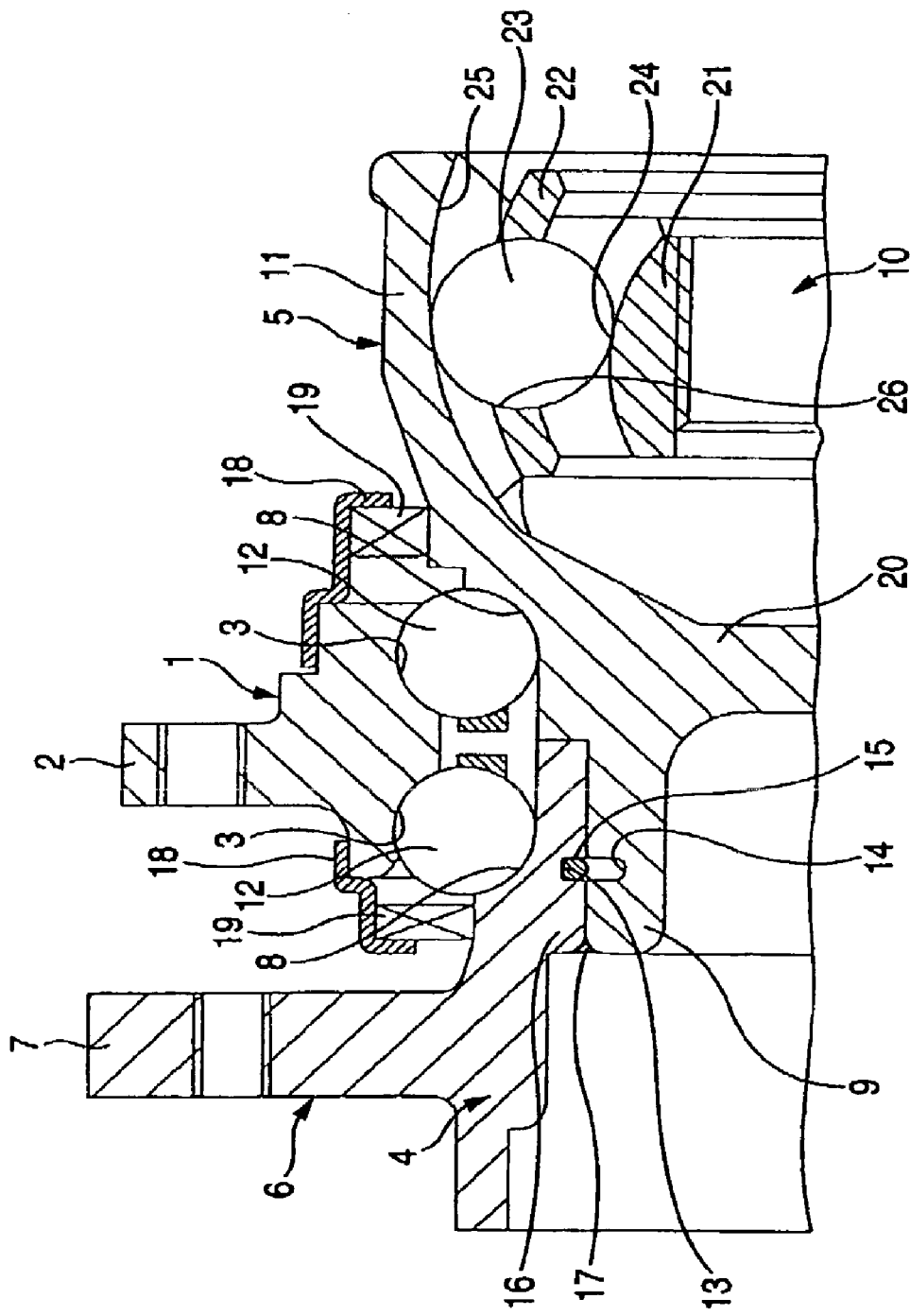
FIG. 10 is a partially sectional view of a first example of a conventional structure.

Next, FIG. 9 shows a sixth embodiment of a drive-wheel axle unit according to the invention. In the present embodiment, the circumferential-direction width dimension of the tooth of a male spline formed on the outer peripheral surface of a spline shaft 32 varies in such a manner that it gradually increases as it goes inwardly (in FIG. 9, in the right direction) in the axial direction of the spline shaft 32. On the other hand, the circumferential-direction width dimension of the tooth of a female spline-formed on the inner peripheral surface of a spline hole 30 formed in the central portion of a hub 6b—varies in such a manner that it gradually increases as it goes outwardly (in FIG. 9, in the left direction) in the axial direction of the hub 6b. The inclination angles of the circumferential-direction side surfaces of the teeth of the male and female splines are set coincident with each other. Then, when the male and female splines are engaged with each other, the circumferential-direction side surfaces of the teeth of the male and female splines are contacted with each other in such a manner that there can be generated almost uniform surface pressure in the axial direction thereof. And, the male and female splines are machined in such a manner that, when a retaining ring 35 is bridgingly interposed between an inside securing groove 14 (serving as an inside engaging portion) and an outside securing groove 13 (serving as an outside engaging portion), the teeth respectively forming the male and female splines can be spline-engaged with each other without generating a clearance between the circumferential-direction side surfaces of the respective teeth.

Thus, according to the present embodiment, by bridgingly interposing the retaining ring 35 between the inside securing groove 14 and the outside securing groove 13, the relative positions of the male and female splines in the axial direction thereof can be fixed. In other words, as an outside engaging portion formed in the inner peripheral surface of the hub 6b, instead of such outside securing grooves as employed in the previously described embodiments each having a stepped structure incapable of regulating the axial-direction position of the retaining ring 35 unequivocally (incapable of fixing the retaining ring in the axial direction thereof), there is formed the concave-groove-shaped outside securing groove 14.

Also, a seal ring 52 is fitted with the outside of the outer peripheral surface of a shoulder portion 51 (formed in the base end portion of a housing portion 11 serving as the outer ring of a constant velocity joint), and the seal lip 53 of the seal ring 52 is contacted with a flat surface 38 formed in the inner-end face of a caulk portion 29a, thereby closing a clearance between the caulk portion 29a and housing portion 11.

In the above-structured present embodiment, when forming the flat surface 38, the axial-direction dimension of the flat surface 38 is set such that the flexing margin of the seal lip 53 provides a proper value (for example, on the order of 0.2–1.2 mm).

INDUSTRIAL APPLICABILITY

Since the present invention is structured and operates in the above-mentioned manner, there can be realized a drive-wheel axle unit which is compact in size, light in weight, and excellent in durability and reliability, thereby contributing toward enhancement in the riding comfort, power performance and fuel efficiency of a vehicle. Also, while the vehicle is in operation, the parts of the present drive-wheel axle unit can be prevented against shaky motion for a long period of time. And when a seal member is incorporated, the sealing performance and durability of the seal member can be secured. Therefore, occurrence of strange sounds, vibrations, and fretting wear, can be prevented, the riding comfort of a vehicle incorporating therein the present drive-wheel axle unit can be enhanced, and the durability of the present drive-wheel axle unit itself further can be enhanced.

What is claimed is:

1. An axle unit for a drive wheel, comprising:
    an outer ring including an outer raceway in an inner peripheral surface of said outer ring, said outer ring being unrotatable even when said axle unit is in use;
    a hub including a mounting flange formed in an outer-end portion of an outer peripheral surface of said hub for supporting the drive wheel, a first inner raceway formed directly or through an outboard-side inner ring in a middle portion of said outer peripheral surface of said hub, a second inner raceway formed in a direction of an inner-end portion of said outer peripheral surface, and a spline hole formed in a central portion of said hub;
    a drive shaft member including a spline shaft disposed on an outer-end portion of said drive shaft so as to be engageable with said spline hole, said drive shaft having an inner-end portion formed as a housing portion to serve as an outer ring of a constant velocity joint; and,
    a plurality of rolling elements rollably interposed between said outer raceway and said inner raceway,
    said axle unit further comprising:
    an inside engaging portion formed so as to extend around the outer periphery of said spline shaft;
    an outside engaging portion formed so as to extend around the inner periphery of said hub, said outside engaging portion being disposed in a position that corresponds to said inside engaging portion; and
    a retaining ring made of elastic material,
    wherein said retaining ring is bridgingly interposed between said inside and outside engaging portions to thereby prevent the spline shaft from slipping out of said spline hole,
    an inboard-side inner ring with said second inner raceway formed in an outer peripheral surface of said inboard-side inner ring, said inboard-side inner ring being fixed to said hub in such a manner that an inner-end face of said inboard-side inner ring is held by a caulk portion formed in the-inner end portion of said hub, which inner-end portion of said hub projects beyond said inner-end face of said inboard-side inner ring, by caulking and spreading the inner-end portion of said hub outwardly in a diameter direction of said hub,
    a portion of said caulk portion, that is opposed to an outer-end face of said housing portion, is formed as a flat surface parallel to said outer-end face of said housing portion,
    wherein said flat surface and said outer-end face of housing portion are butted against each other,
    wherein the retaining ring urges the flat surface of the caulked portion against the outer end face of the housing portion.

2. The axle unit for driving wheel according to claim 1, wherein the retaining ring is formed in a substantially triangular shape in a sectional view so that a thickness of the retaining ring is reduced toward an inner radial direction.

* * * * *